United States Patent [19]

Triggiani et al.

[11] 3,855,061
[45] Dec. 17, 1974

[54] NUCLEAR REACTOR FUEL PLATE

[75] Inventors: Leonard Vincent Triggiani, Silver Spring; Moises Gali Sanchez, Severna Park; George Elliott Ashby, Highland, all of Md.

[73] Assignee: W. R. Grace & Co., Columbia, Md.

[22] Filed: June 21, 1971

[21] Appl. No.: 155,014

Related U.S. Application Data

[63] Continuation-in-part of Ser. No. 710,709, Feb. 28, 1968, Pat. No. 3,586,746.

[52] U.S. Cl. ............ 176/75, 176/91 SP, 176/93 BP, 176/73
[51] Int. Cl. ............................................. G21c 3/30
[58] Field of Search ............. 176/75, 71, 68, 76, 78, 176/91 SP; 252/301.1

[56] References Cited
UNITED STATES PATENTS

| | | |
|---|---|---|
| 3,331,785 | 7/1967 | Fitch et al. ........................ 252/301.1 |
| 3,097,152 | 7/1963 | Walker ............................. 176/75 X |
| 3,476,645 | 11/1969 | Turner ................................. 176/71 |
| 3,004,906 | 10/1961 | Binstock ........................... 176/75 X |
| 3,422,523 | 1/1969 | Kling ................................. 176/75 X |

*Primary Examiner*—Benjamin R. Padgett
*Assistant Examiner*—P. K. Pavey
*Attorney, Agent, or Firm*—Andrea G. Nace; Kenneth E. Prince

[57] ABSTRACT

An improved nuclear fuel element which comprises an ordered array of spherical fuel particles dispersed in a flat plate; and the use of this fuel element to render improved heat transfer characteristics to nuclear reactor systems.

5 Claims, 6 Drawing Figures

INVENTORS
M. G. SANCHEZ
G. E. ASHBY
L. V. TRIGGIANI

BY *Andrea M. Giardina*

AGENT

NUCLEAR REACTOR FUEL PLATE

This application is a continuation-in-part of application Ser. No. 710,709, filed Feb. 28, 1968, now U.S. Pat. No. 3,586,746, dated June 22, 1971 in which a method is described for the preparation of nuclear fuel plates wherein individual foils are impressed with cells of controlled dimensions and shape in a regular array and fuel particles containing fissile materials are inserted into the cells by vibration, compression, suction or other means. The foil is then laminated to additional foils to yield a unitized fuel plate with the fuel particles dispersed uniformly throughout. This method of preparation provides a fuel plate structure in which fuel-bearing particles are present as individual small cells of fuel, each encapsulated within a matrix.

The present invention relates to the use of these improved fuel plates in nuclear reactor systems and to the improvements rendered thereto.

BACKGROUND OF THE INVENTION

Prior art fuel elements used in nuclear reactors can be divided into two general classes — flat plate fuel elements and cylindrical rod fuel elements.

A requirement for plate fuel elements is that the fuel be metallurgically bonded to the cladding. Fuel elements of this type are conventionally brazed in parallel relation between two side plates. Many difficulties arise during the manufacture of these fuel elements including deformation of the fuel plates and cladding caused by high brazing temperatures, blistering of the fuel elements during brazing operations, introduction of poison materials into the brazed joints therefore reducing the number of neutrons available for fission, leakage of corrosive substances from the brazed joint when the assembly is exposed to the reactor coolant as well as others.

Cylindrical rod fuel elements comprise ceramic fissile material, such as uranium dioxide, in a number of stacked cylindrical pellet compacts. These compacts are located in, but not bonded to a cylindrical tube or cladding having plugs at the open ends. Suitable cladding materials having a low thermal neutron cross section include aluminum, zirconium, an alloy of zirconium, or stainless steel.

There are several disadvantages of cylindrical fuel elements of this type including difficulty in manufacturing zirconium tubing of any substantial length and therefore necessitating a plurality of short tubular members rather than a long single rod; high central temperatures due to poor heat transfer characteristics between ceramic material and cladding since there is no bonding between fuel and cladding; limited heat transfer surface between fuel and cladding; and relatively large diameters of tubular ceramic fuel elements. However, the most critical disadvantage of these cylindrical rod fuel elements is that in the event of a rupture in the cladding, the fuel material and the fission products released by the fuel material enter the reactor coolant which is normally at a high temperature and pressure and cause it to become radioactive, therefore, necessitating shutdown of the reactor.

Many attempts have been made to produce a nuclear fuel element which overcomes these prior art disadvantages.

One such attempt is the flat plate compartmented ceramic fuel element housing unbonded fuel taught by U.S. Pat. No. 3,070,527 issued to Hurford et al. The fuel material used in this fuel element is in the form of packed powder wafers 0.5 inch in width and 6.0 inches in length. These wafers are pressure packed and sintered to high densities, (about 96 percent-theoretical density).

By utilizing a plurality of fuel compartments, Hurford et al attempted to decrease the amount of fuel material and fission products produced therefrom which would be exposed to the coolant in the case of a rupture in the cladding. However, the amount of fuel material and fission products produced from one wafer could cause significant contamination of the coolant.

The use of heterogeneous fuels, the system in which the particles of fissile material are dispersed in or surrounded by a fuel free matrix, is growing rapidly. This system provides a structure in which fuel-bearing particles are present as individual small cells of fuel, each encapsulated within a matrix. The resulting composite is more stable under radiation than comparable homogeneous fuel materials because the operating life is increased through localization of fission fragment damage.

The prior art methods of fabrication of dispersion fuels embody blending coated particles with a powdered precursor of the matrix material. Mixing in this manner results in a non-uniform distribution of the spherical fuel material in the matrix material. This non-uniformity is a serious drawback and is especially marked when the spherical fuel particles and the matrix precursor powder are of widely different particle sizes and shapes. Non-uniformity is also a serious problem when it is desirable to mix the fuel with additional components such as burnable poisons, coated boron carbide particles, for example. Even under the most ideal of mixing conditions, a certain amount of non-uniformity of particle distribution is inherent in this method owing to the wide distribution of sizes of the spherical fuel materials themselves as obtained by classical ceramic processing techniques.

During the mixing operation, fuel particles sometimes come in violent contact with each other. This leads to rupture of the particle coating and release of the fuel material into the matrix precursor. This may lead to rejection of the finished fuel element for poor quality. The released fuel would contaminate the matrix in the final fuel element and result in hot spot formation, damage to the matrix material and fission product release. Often such defects are undetected prior to loading a fuel element in a reactor. Fuel element failure during reactor operation leads to contamination of the coolant, the reactor environment and eventual reactor shutdown.

During the mixing operation, and the pressing and compaction operations which follow, the geometric non-uniformity of particle distribution and particle sizes and shapes often leads to violent collision between spherical particles which result in flattening and distention of the coated particles in such a manner as to produce stringering and micro-cracks in the final fuel element. This behavior leads to the formation of hot spots in a reactor and also to the formation of cracks in the fuel element which result in fission product contamination of the fuel element matrix and the fuel element environment.

OBJECT OF THE PRESENT INVENTION

It is, therefore, an object of the present invention to provide a fuel element which overcomes all of the prior art disadvantages.

The principal object of this invention is to provide a novel fuel element which comprises an ordered array of spherical particles in a flat plate.

Another object of this invention is to provide a nuclear fuel element in which the fuel material composition, density and distribution is accurately controlled.

It is still another object of this invention to provide high fuel loadings and high fuel burnup in a fuel element having a nuclear fuel dispersed in a metal matrix.

A further object of this invention is to provide fuel plates that provide a means of extending the life of the fuel cores in a nuclear reactor.

A still further object of this invention is to minimize fuel swelling and fission gas release during irradiation.

It is an additional object of this invention to provide fuel elements in the form of plates that contain neutron poisons and/or moderating materials.

These and other objects of this invention will be more easily understood from the following detailed description of the invention with reference to the attached drawings.

BROAD DESCRIPTION OF THE INVENTION

This invention relates broadly to a nuclear reactor fuel element comprising at least one filler plate perforated with a series of cells with a diameter of 10–3,000 microns arranged in an ordered array and filled with fissile material, and a pair of cladding plates secured to these filler plates and cooperating therewith to completely enclose the fissile material and the use of a series of the plates to form the fuel element assembly of a nuclear reactor.

It is within the scope of this invention that the fuel element of this invention may contain only one or many filler plates stacked one upon another and enclosed with cladding plates to form the fuel element. For purposes of simplicity a fuel element containing only one filler plate will be discussed throughout this application, however, it is not intended to limit the scope of the invention. Obviously, the number of plates is unlimited. Although only one filler plate is generally employed, it would not be uncommon to use as many as 10 or more.

According to a well known author in the field of dispersion fuel elements, an ideal dispersion is an array of uniform, spherical, fuel particles, sized to permit a reasonable amount of matrix metal between particles to remain undisturbed by fragments.

The use of spherical particles of $UO_2$ and the like in lieu of conventional, irregularly shaped particles including wafers of packed powder is most desirable in fuel element manufacture for a number of reasons. Use of a sphere form will minimize fracture of the particle during the manufacturing operations required in fabricating fuel elements, since a sphere form enjoys an inherent structural stability. It has been noted that sphere form fuel particles will be maintained as discrete particles within a matrix thereby minimizing the radiation damage area around them. A spherical particle will also present a minimum amount of surface area which, in turn, will minimize corrosion or reaction of fuel and matrix. Spherical fuel particles also offer higher density upon compaction and a decrease in stringering of the fuel element during fabrication.

Therefore, one of the most critical factors to be considered in attaining an ideal dispersion is the physical and chemical characteristics of the fuel itself. The introduction of microspheres as are described and prepared in U.S. Pat. No. 3,331,785 has resulted in substantial improvements in fuel technology. Copending applications Ser. No. 710,707, 710,708 and 710,709 filed Feb. 28, 1968 cover processes for preparing fuel plates utilizing these microsphere materials. The present application is concerned with using these fuel plates in nuclear reactors and, therefore, offering all of the advantages of the ideal dispersion fuel system to the design of reactor cores.

The microspheroidal particles described in U.S. Pat. No. 3,331,785, have unique physical and chemical properties that make them particularly desirable in the preparation of fuel plates. Although "microspheres" have been prepared by other described techniques, the particles prepared by these techniques do not have the desirable set of chemical and physical properties necessary for preparation of the fuel plates of our invention.

These spheres can be produced in very closely controlled size ranges. Since this is the case, a predetermined array of cells of regular size and shape can be fabricated to accommodate these spheres. This is not possible where the particles have irregular sphericity and vary widely in size.

One embodiment of this invention is a regular array of cells in which the positions of the cells are in one of 17 plane groups (see International Tables for X-Ray Crystallograph p. 58–72).

In a second embodiment, the cells are in an irregular predetermined array where the spacing between cells varies from place to place in the filler plate.

Since few of our spheres vary from sphericity, they can be more easily coated than poorly shaped particles. The coatings on these particles are uniform and have an excellent retentivity of fission products. Because the surface texture is smooth, the coatings are strong and have no tendency to weaken during fabrication or use in a reactor. Examples of suitable coatings include niobium, nickel, alumina, pyrolytic graphites and other similar materials.

One of the principle problems encountered in the prior art microspheres, characterized by poor sphericity and irregular surface, results from the tendency of uranium to migrate through the coating at point where surface irregularities exist.

In the classical process of sphere formation, high temperatures are required to spheroidize the irregular shaped particles and to achieve composition uniformity or solid solution in binary or multi component systems. These high temperatures are incompatible with low denisty (40 to 80 percent of theoretical). In the process described in the 785 patent, solid solution and spheroidization we achieved in materials that have been treated at temperatures up to 80° to 100°C.

These microspheres can be prepared in sizes from about 50 to 3,000 microns and can be prepared to have a narrow size distribution in this range. The densities can vary from about 40 to greater than 90 percent of theoretical. They can be prepared to contain other materials, such as zirconia, for example, that improve the physical properties of the actinide oxide fuel. The microsphere route also provides a convenient means for introducing nuclear poisons, such as gadolinium or samarium, for example, to the fuels when desired. The microsphere route also provides a convenient means of introducing neutron poisons, or neutron moderating materials. Boron containing compounds such as $B_4C$, for example, may be added to the fuels when desired.

Fuel elements have been prepared by randomly mixing the microspheres into the metal powders. The microsphere containing powders are then pressed and rolled to form a plate. Although the introduction of microspheres greatly improved the prior process where the particles were not uniform in size or shape, the method has been limited to a microsphere loading, and consequently a fuel loading of 15 volume percent or less. More frequently, loadings are restricted to 10 or 12 volume percent. At loadings higher than this, many microspheres come into contact with each other, consequently causing interparticle fracture during the rolling operation. This fracture leads to interconnected porosity, which is a condition deleterious to the corrosion, heat transfer properties, and safe operation of the fuel plate.

The demands for safe, efficient fuels that can be operated to high burnups at high temperatures have motivated the development of coated particle fuels. Currently available techniques for fabrication of fuel elements matrices, however, have not kept pace with the development in fuel particle technology. Our matrix will protect the fuel from the reactor coolant, thereby protecting the fuel from deleterious chemical reactions; minimize the release of fission products into the coolant; contain the fuel and prevent its diffusion or migration at high operating temperatures; allow a void volume to accommodate the swelling of the fuel particle during the accumulation of fission products; restrict the damage caused by fission product recoil to a microscopic region; and provide a fabrication technique which will allow higher fuel volume loadings than currently available. The matrix is formed from a corrosion resistant material having a low thermal neutron cross-section selected from the group consisting of aluminum, aluminum alloys, stainless steel, the various zircalloy materials, zirconium, graphite, beryllia and alumina.

The fuel elements may be utilized in a reactor in a variety of geometric configuration. For example, these elements may be unitized to produce a series of stacked plates interspersed with channels to allow the flow of coolant, or the elements may be unitized in an open cylindrical configuration. A series of concentric cylindrical fuel elements interspersed with channels for gaseous or fluid coolant could also be produced by our process.

The coated spherical particle dispersed in the fuel element may also be used with great advantage in the so-called "seed-and-blanket" reactor. The seed-and-blanket reactor is aimed at obtaining the maximum power output from natural uranium or thorium. The blanket of natural uranium or thorium captures a large fraction of the excess number of neutrons over those required to maintain the chain reaction. The blanket breeds fissile material by producing $Pu^{-239}$ or $U^{-233}$. Thus the minimum investment and expenditure of $U^{-235}$ or thorium are achieved. The plutonium generated is burned in situ in the core and minimum core size for a given power output is achieved. As the lifetime of the core increases, there is a gradual increase in the ratio of power produced in the blanket to that produced in the seed. An advantage of the seed-and-blanket system is that it avoids the power "peaking" in the center of a uniformly loaded core.

A nuclear reactor core can be fabricated whereby the respective seed-and-blanket components may be suitably distributed either within a given foil, or fuel plate, or collection of fuel plates or any desired combination of these.

After the fuel has been in the reactor for sometime, it is removed from the reactor and reprocessed. The fuel values remaining, after reprocessing, is returned to the customer for fabrication into additional fuel elements.

Our novel fuel plate provides a fuel source wherein the fuel is easily separated from the matrix and thus affords a method of reducing reprocessing costs.

DETAILED DESCRIPTION OF THE INVENTION

Figure 1:
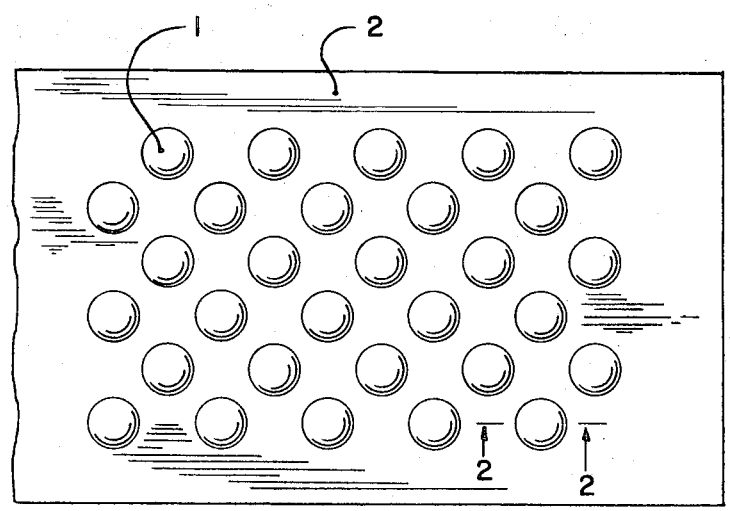
Figure 2:
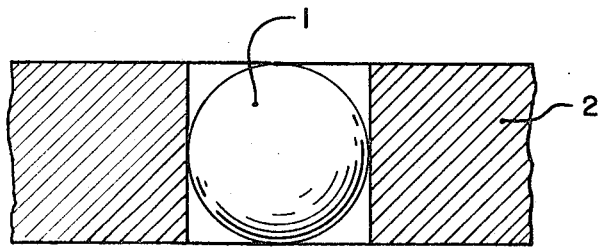
Figure 3:
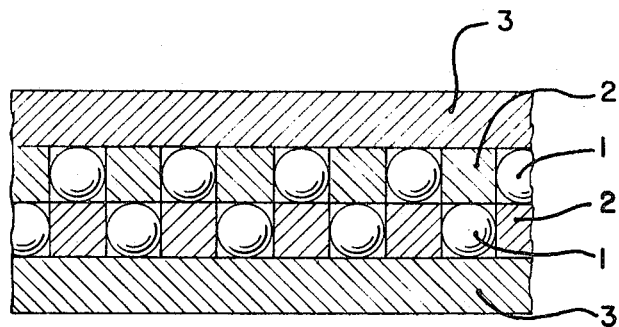

In order that the character of the individual foils and fuel plates may be better understood, reference is made to the drawings in which the characteristics of the fuel plate and individual particles are illustrated. In FIG. 1, there is illustrated a top view of an individual foil after compression. This view shows the microspheres 1 in the plate 2. FIG. 2 is a cross section of FIG. 1 along the line 2—2 and shows a section of the individual foil. The microsphere 1 is positioned in the cell in the manner such that void space is allowed for collection of gases and other fission products and to allow for expansion of the microsphere 1. The position of the individual microsphere in the foil 2 is shown in this drawing. FIG. 3 is a cross sectional view of one embodiment of a finished fuel plate. The fuel plate has upper and lower foils 3. The arrangement of the microspheres 1 in relationship to the unperforated sections of the fuel plate 2 are shown in this figure.

The individual foils, making up the fuel plate, are bonded together. Since it is generally desirable to exclude air from the space in the cells not occupied by the particles as well as from the fuel themselves, this bonding is most advantageously done under vacuum or in the presence of an inert gas, such as nitrogen, helium, argon, etc. This may be done using different techniques. Examples of suitable techniques include bonding, welding, pressing, rolling, vacuum bonding, brazing, etc.

Where the sphere is of maximum density, and it is desirable to retain some void space in each of these cells to aid in the collection of fission products and to allow space for swelling of the individual microspheres, the foils are assembled and bonded by pressing, welding, or some other means that allows retention of some or all of the residual void space in the cells.

A number of advantages are offered by the fuel element of the present invention. In one specific aspect it provides a convenient means of dispersing non-$UO_2$ material within the $UO_2$ fuel region. Materials that may be mixed with $UO_2$ in various reactors includes:

a. Other fuel materials, such as $PuO_2$ or $ThO_2$
b. Burnable poison materials, such as $Gd_2O_3$ and boron compounds
c. $UO_2$ particles having a different U-235 enrichment than the basic fuel The non-$UO_2$ materials may be dispersed throughout the fuel elements in any desired distribution, including uniform distribution, discrete zones, and graduated concentrations. Redistribution or loss of non-$UO_2$ material during fabrication, as has been experienced with ceramic $UO_2$ pellet type fuels during sintering, is eliminated by the purely mechanical final proportioning of compounds and fuel element assembly. Redistribution of constituents during irradiation is also reduced or eliminated, barring physical damage to the fuel element. The ability to accurately control the fuel material composition and composition distribution leads to the following design advantages:

a. Flattening of the powder distribution along the length of a fuel assembly or from plate to plate in a fuel assembly. This reduces core size and fuel inventory for a given power output. A reduction in core size (increase in power density) has advantages which extend beyond the core. Foremost is a smaller reactor vessel and the associated reduction in the cost of this component. The smaller reactor vessel results in a decrease in the total reactor system coolant inventory. This, in turn, reduces the required size and/or design pressure of the containment vessel, further reducing the total cost of the nuclear power plant.
 b. Precise control of reactivity by burnable poisons with minimum poison residue at end of life. This increases core life and reduces control rod requirements. Both of these improvements offer economic advantages. An increase in core life reduces the unit cost of energy since the cost of fuel fabrication, shipment and reprocessing (which are not affected by core life) are amortized over a larger total energy production. A reduction in control rod requirements results in savings since a lesser number of control rods and control rod drive mechanisms are needed.

A second specific aspect of this invention is that it provides a means of controlling the fuel density distribution either longitudinally along each fuel plate or on a plate to plate basis. Appropriate variations in fuel density can be used to flatten the core power distribution, thereby increasing core power density and specific power and reducing fuel inventory and core size.

The swelling of $UO_2$ fuels due to the formation of fission products within the $UO_2$ and to enhanced plasticity of $UO_2$ under irradiation has been frequently observed. This phenomenon imposes constraints on fuel element lifetime under irradiation and imposes certain design restrictions on ceramic fuel elements.

A third specific aspect of this invention is that it provides a mechanism of accommodating the swelling of individual $UO_2$ particles without gross distortion of the fuel plates by providing expansion space for each particle:

a. As a central void region within the particle.
 b. In the cell in the matrix plate into which each particle is inserted. Since spherical $UO_2$ particles are inserted into cylindrical cells having a height and diameter equal to the diameter of the spherical particle, the ratio of the cell volume to the particle volume is $$\pi R^2 (2R)/4/3\pi R^3 = 1.5$$

c. As distributed porosity within a less than 100 percent dense particle.

The accommodation of particle swelling without a commensurate gross distortion of the fuel plate is a significant advantage. Higher burnups may be obtained without the danger of locally obstructing coolant flow passages and causing the safety problems inherent in that situation. Higher burnups result in a longer core life and associated economic advantages.

The release of fission product gases from the $UO_2$ fuel during irradiation is a major design consideration in all reactors because of the potential leakage of these radioactive gases into the reactor coolant and coolant system components, which complicates maintenance operations, and the potential release of these gases to the environment. Fission gas release has been found to increase with increasing $UO_2$ temperatures and increasing burnup.

A fourth specific aspect of this invention is that it provides a mechanism of reducing fission gas release. The voids present in the individual $UO_2$ particles and in the cells into which each particle is set provide space for accumulation of fission gases that are released from the $UO_2$.

In pellet-in-tube fuel elements, fission gas from all portions of the fuel rod are collected in a single, interconnected volume. The loss of cladding integrity therefore results in the release of all of the fission gases produced in that rod, even though the clad failure may be highly localized. With the instant invention, the fission gases escaping from the $UO_2$ particles will be collected in individual isolated expansion volumes. Localized clad or plate failures would release only a fraction of the total fission gas to the reactor coolant. This provides a significant safety advantage. A fifth specific aspect of this invention is that it provides a means of reducing the operating temperature of the fuel phase by providing a matrix of metal having a higher thermal conductivity than $UO_2$. For a given heat generation rate and reactor coolant temperature, the $UO_2$ particles will be operating at a lower temperature than the bulk $UO_2$ in a pellet-in-tube type fuel element, where centerline temperatures approaching the melting point of $UO_2$ are common design practice.

In a fast neutron power reactor (e.g., fast breeder), it is desirable to have as many quick-acting negative reactivity coefficient mechanisms as possible in order to provide inherent safety in the event of a reactivity excursion. One such quick-acting mechanism is the increased thermal expansion of the fuel material with increases in power. The reduced fuel density in the core tends to reduce reactivity in a properly designed core.

A sixth specific aspect of this invention is that it can be used to enhance the negative fuel expansion coefficient of reactivity if the $UO_2$ spheres are imbedded in metallic plates that have higher coefficients of thermal expansion than the commonly used $UO_2$-$PuO_2$ and UC-PuC ceramic fuels. Core designs could be tailored to take advantage of this enhanced fuel expansion coefficient of reactivity.

Figure 4:
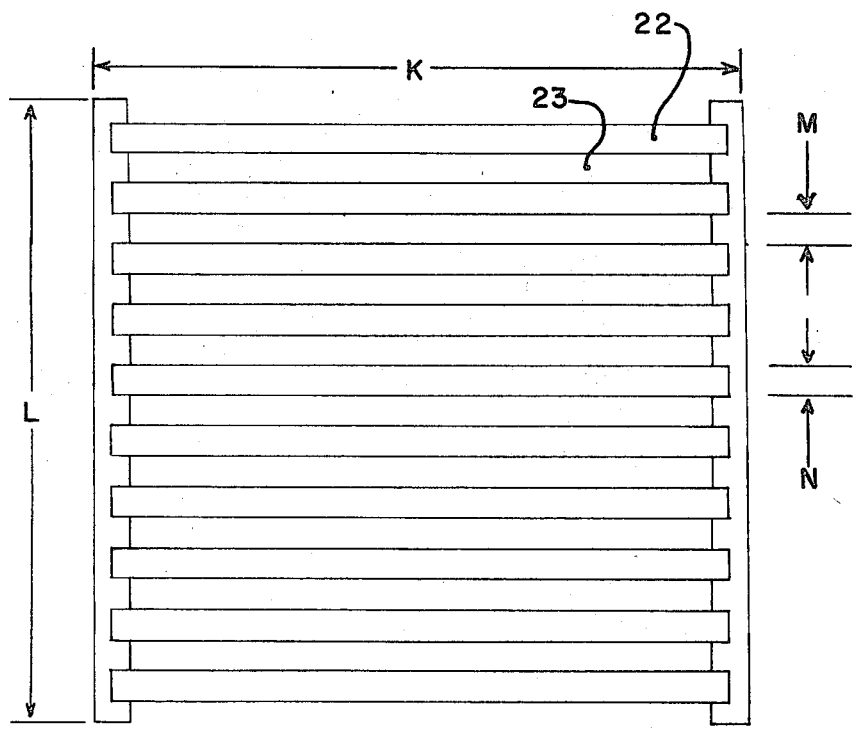
Figure 5:
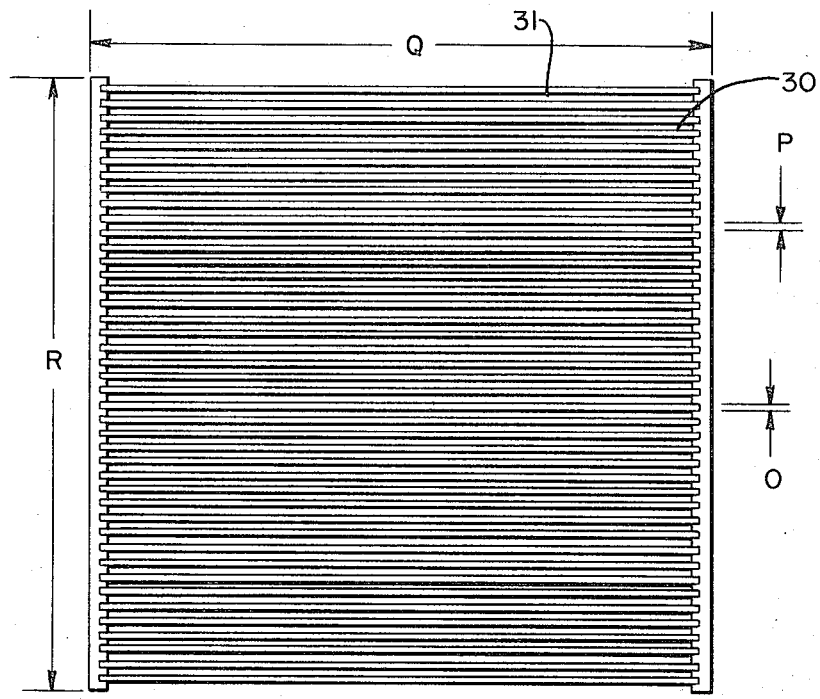
Figure 6:
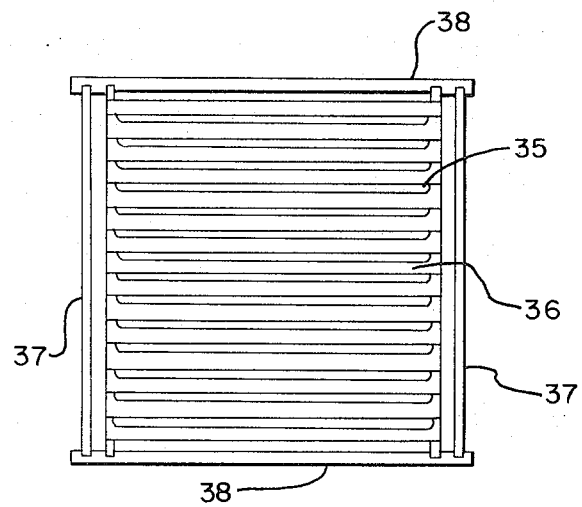

A further understanding of the present invention and its use in nuclear reactors will be evident from the following detailed description of possible reactor designs and FIGS. 4, 5 and 6.

1. A boiling water replacement core for a central station plant.

FIG. 4 illustrates the use of fuel plates in the replacement core for a boiling water reactor (BWR) with a power rating of 2436 MWT.

A standard fuel assembly for the BWR consists of 49 Zircaloy clad $UO_2$ pellet-in-tube type fuel rods arranged in a 7 by 7 array. The fuel length of the assembly is 12 feet.

The alternate assembly is constructed of flat plates containing $UO_2$ fuel particles in an ordered array.

The cross sectioned dimensions of the alternate assembly are identical to those of the original standard assembly. The total length of the alternate assembly is either identical to the original assembly or is made up of several partial length assemblies which are then attached mechanically. The alternate assembly is simpler than the standard assembly in two ways. First, intermediate spacers used to support the long, thin fuel rods in the standard assembly are not required in the alternate assembly due to the rigidity of the flat plate. A slight curvature may be added to the plate to enhance the rigidity. Second, grid plates are not needed at the upper and lower ends of the assembly again due to the rigidity of the assembly.

The flat plate assembly easily provides sufficient heat transfer and coolant flow areas. Reference is made to FIG. 4 which illustrates plate and assembly cross sectional dimensions which provide essentially the same heat transfer and coolant flow areas in the alternate assembly that exist in the standard assembly. Referring to FIG. 4, the length, $L$, and the width, $K$, of the assembly are both 5.438 inches. Each fuel plate, 22, is separated by a coolant channel 23. The dimension $N$, the thickness of the fuel plate is 0.245. The dimension $M$, the width of coolant channel is 0.307 inch. Because of the degree of power flattening with the fuel plate less actual heat transfer surface area is really needed in the alternate assembly than in the standard assembly. The more uniform power distribution within the core lowers the actual total coolant flow rate requirment.

The total U-235 content in a standard assembly is 8.6 pounds. As shown in Table I, significantly more fissile material is present in the replacement assembly at reasonable values of particle theoretical density, U-235 enrichment, and volume fraction of $UO_2$ in the matrix.

From this design it is seen that the flat plate assembly is a direct replacement for a standard boiling water assembly.

2. Reduced Central Station Boiling Water Reactor Core.

The design advantages of the fuel plate element cannot be fully utilized in a replacement core where the number and exterior dimensions of the assemblies are established by the original reactor design. However, a considerable size reduction of the core and container vessel is achieved if the reactor design is based on the fuel plate element. This example is an illustration of the size reduction possible.

A boiling water reactor core is constructed at a design power of 2436 Mwt. Fuel assemblies are used with exterior dimensions identical to the exterior dimensions of a standard BWR assembly, but comprised of flat fuel plates. A cross sectional view of the fuel core is again shown in FIG. 4. Referring to the Figure in this case, the length, $L$, and the width, $K$, of the assembly are both 5.438 inches. The fuel plates are separated by a water channel 23. The dimension $N$, the thickness of the fuel plate is 0.221. The dimension $M$, the width of the water channel is 0.279 inch.

By the use of the fuel plate element a reduction in the radial power peaking of 10 percent and a reduction in the overall power peaking of 20 percent is achieved as compared to the standard BWR design. Several different combinations of fuel enrichment, particle density and volume fraction of the $UO_2$ in the matrix are useable. These are given in Table II.

The total number of fuel assemblies in the core for all combinations in Table II are 404 assemblies. This is a 21 percent reduction in the number of assemblies over the 560 assemblies in the standard BWR core at the saem design power of 2436 Mwt.

TABLE I

FISSILE FUEL LOADING IN FLAT PLATE FUEL ELEMENT

| Particle Density, % of T.D. | U-235 Enrichment, wt % | Volume Fraction of $UO_2$ in matrix | $UO_2$ Weight per 12 ft long Assembly, pounds |
|---|---|---|---|
| 90 | 10 | 0.20 | 9.0 |
| 90 | 10 | 0.25 | 11.3 |
| 90 | 15 | 0.20 | 13.5 |
| 90 | 15 | 0.25 | 16.9 |
| 90 | 20 | 0.20 | 18.0 |
| 90 | 20 | 0.25 | 22.5 |
| 75 | 10 | 0.25 | 9.4 |
| 75 | 15 | 0.20 | 11.3 |
| 75 | 15 | 0.25 | 14.1 |
| 75 | 20 | 0.20 | 15.0 |
| 75 | 20 | 0.25 | 18.8 |
| 50 | 15 | 0.25 | 9.4 |
| 50 | 20 | 0.20 | 10.0 |
| 50 | 20 | 0.25 | 12.5 |
| 50 | 25 | 0.20 | 12.5 |
| 50 | 25 | 0.25 | 15.6 |

TABLE II

FISSILE FUEL LOAD AND U-235 ENRICHMENTS IN REDUCED SIZE BOILING WATER REACTOR CORE

| Basis | Fissile Loading per Assembly, pounds | Particle Density, % of T.D. | Volume Fraction of $UO_2$ in Matrix | U-235 Enrichment, wt % |
|---|---|---|---|---|
| Same fissile loading per assembly as standard assembly | 8.6 | 75 | 0.25 | 9.2 |
| Same total fissile loading in core as standard core | 11.9 | 75 | 0.25 | 12.8 |
| 50 percent greater fissile loading per assembly than the standard assembly | 12.9 | 75 | 0.25 | 13.8 |
| 25 percent greater total core fissile inventory than the standard core | 14.9 | 75 | 0.25 | 16.0 |

3. A compact pressurized water reactor with a high power density.

There are a number of reactor applications in which a compact high power density system is extremely desirable. A prime example is a maritime reactor which is utilized for ship propulsion. High power levels are desirable to obtain high ship speeds and thus increase revenues by moving more cargo per unit time. A compact system is desired so that the weight and size of the power plant does not significantly reduce the cargecarrying capacity of the ship.

The American nuclear powered maritime vessel, the N. S. SAVANNAH, uses a nuclear reactor core comprised of 32 fuel assemblies, each having an 8.5 × 8.5 inch cross section. Each fuel assembly contains 164 half-inch diameter fuel rods. The N. S. SAVANNAH reactor is of the pressurized water type. Recent safety analyses have shown that the maximum power level is limited by maximum fuel pellet temperature considerations to a power level of 104 Mwt.

An alternate fuel assembly having exterior dimensions identical to the exterior dimensions of the standard pressurized water reactors was designed based on the fuel plate concept. FIG. 5 illustrates a cross sectional view of the fuel core. Referring to this figure, the length, $R$, and the width, $Q$, are both 8.5 in. The fuel plates, 30, are separated by water channels, 31. The dimension 0, the thickness of the fuel plate is 0.085 inch. The dimension $P$, the width of the channel is 0.115 inch. The power level of the core was maximized while maintaining the identical number and size of the fuel assemblies. This was accomplished within current state-of-the-art limitations for pressurized water reactors. The following parameters were selected as being representative of the current state-of-the-art:

| | |
|---|---|
| Coolant velocity | 15 ft/sec |
| Maximum heat flux | 400,000 Btu/hr-ft$^2$ |
| Average coolant temperature rise in the core | 50°F |
| Normal operating pressure | 1750 psia (identical to N. S. SAVANNAH) |
| Average coolant temperature | 508°F (identical to N. S. SAVANNAH) |
| Fuel plate thickness, including | 0.085 inch |
| Cladding thickness | 0.01 inch |

Equations defining the heat transfer and heat transport limitations of the core were written in terms of the number of fuel plates per assembly and the total core thermal rating. These equations were solved simultaneously to determine the acceptable values of these two parameters. The results showed that a core, based upon the fuel plate, but having the same number and size of fuel assemblies as the N. S. SAVANNAH core could produce 400 Mwt. Each assembly would have 42 fuel plates. The maximum fuel plate temperature was then calculated and found to be approximately 710°F, which is well within the current state-of-the-art for the potential matrix materials.

As stated earlier, the current N. S. SAVANNAH is limited to 104 Mwt by maximum fuel temperature considerations. To increase the power level to 400 Mwt, as can be done with our concept, would require about 630 pellet-in-tube type fuel rods in each fuel assembly. This is virtually impossible to achieve in a practical design without increasing the cross sectional dimensions of each assembly (and hence the overall core size) by a considerable amount.

The possible range of fissile fule loading in the core utilizing our concept was evaluated. The calculations were based on a particle density equal to 75 percent of theoretical density and a fuel volume fraction in the matrix of 25 percent. U-235 loading per assembly and U-235 enrichment were treated as variables. The results are presented in Table III in terms of the fissile loading in the fuel plate assembly compared to the average fissile loading in each N. S. SAVANNAH fuel assembly. These results show that as much as 4.66 times the N. S. SAVANNAH loading can be achieved with our concept.

TABLE III

FISSILE FUEL LOADING FLAT PLATE IN MARITIME REACTOR CORE

| Ratio of Fuel Plate Assembly U-235 Loading to N.S. SAVANNAH U-235 Loading | U-235 Loading Per Assembly (pounds) | Enrichment (wt% U-235) |
|---|---|---|
| 1.0 | 22.5 | 19.9 |
| 1.5 | 33.8 | 29.9 |
| 2.0 | 45.0 | 39.8 |
| 2.5 | 56.3 | 49.8 |
| 3.0 | 67.5 | 59.7 |
| 4.0 | 90.0 | 79.6 |
| 4.66 | 105.0 | 93.0 |

4. A liquid metal cooled fast breeder core.

The fast breeder reactor is an extremely important class of reactors. The generally high power per unit volume (compared to conventional BWR and PWR power reactors) of the fast breeder reactor type has lead to designs having closely packed fuel arrays of small diameter rods or thin plates.

Reactor control requirements for the fast breeder are much more stringent than for a conventional thermal reactor. The effective delayed-neutron fraction of the plutonium fuel in a typical fast breeder is approximately one-half that in a thermal, uranium fueled core, and the prompt neutron lifetime in the fast reactor is much smaller than that in a thermal reactor. One technique that has been proposed for reducing the inherent reactivity control problem is the controlled expansion fuel assembly. This assembly is comprised of a fuelbearing structural member which is as long as the active core and two other fuel subassemblies which are each slightly less than one-half the length of the active core. The two subassemblies contain most of the active fuel in the overall assembly. Each of the two shorter subassemblies is attached at only one of its ends to an end of the main structural member. The two shorter assemblies are guided radially by suitable spacers from the fueled structural member, but are allowed to expand axially independent of the fueled structural member.

As a sudden increase in core power level raises the fuel particle temperature throughout this assembly, the full length structural member elongates more and faster than the shorter assemblies due to differences in geometry, thermal expansion coefficients, and thermal diffusivities of the materials used. The result is the axial separation of the two shorter subassemblies equivalent to removing fuel from the center of the core. This effectively provides a predictable negative temperature coefficient of reactivity resulting from thermal expansion.

Our concept of discrete particle loading and variable loading distribution is applicable to the controlled expansion concept and provides a unique method of adjusting the effective thermal expansion coefficient of two adjacent assemblies. One of the key elements in the axial expansion response of the fueled subassemblies and structural member is the relative resistance to heat transport from the individual fuel particles to the liquid metal cooled heat transfer surface. Our concept allows variation in the effective thermal diffusivity of the fuel plate matrix by variation in individual particle density, void space outside each spherical particle, and volume percent of particle loading in the matrix.

Using this technique, an element assembly having different matrices in the structural, full core length section and the shorter, fueled subassembly sections is fabricated. This assembly is designed such that the differing thermal response of the two matrices gives the desired transient and steady state differential expansion necessary to contribute effectively to reactivity control.

A liquid metal cooled fast breeder fuel assembly using our element concept is shown in cross section in FIG. 6. This assembly uses plate type elements of two types. The outer pair, 37, extends the full core length and, with two unfueled support plates, 38, forms the main structural box or envelope of the overall assembly. The inner two fueled subassemblies, each of approximately one-half core length, are comprised of fueled plates, 36. The assembly envelope dimensions, number of plates, and plate thickness are selected to provide an assembly with outer dimensions, total heat transfer surface area, and coolant channel, 35, flow area in the desired range.

5. A Gas Cooled Reactor Core.

The gas cooled reactor uses an inert gas, usually helium, as the primary coolant. Gas cooled reactors usually evaporate water in a secondary system, although gas turbines may be used in a direct cycle.

Good thermal conductivity, high strength at elevated temperatures, excellent thermal resistance, and good moderating ability make graphite an attractive matrix material for the filler plates of our invention.

Early work in graphite matrix materials involved impregnating porous graphite with uranium bearing solutions and then converting to a carbide or oxide in situ. The very small size of the fuel phase in this approach led to excessive matrix damage during irradiation.

A more extensively used procedure for producing graphite matrix fuels consists of adding the fuel in oxide form to graphite, fabricating the matrix and converting the oxide to carbide by reaction with the adjacent graphite. The major disadvantage in this method is that the removal of carbon produces a void between the matrix and the fuel particle which tends to weaken the structure.

More recent fabrication procedures employ such techniques as hot molding a matrix of graphite and pitch and fuel particles or extruding a mix of fuel particles and carbonaceous fillers and binders. The disadvantages of these approaches are manifold. During the mixing procedures, particles of different sizes and densities tend to segregate and yield non-homogeneous fuel dispersions. The high temperatures employed also result in undesirable residues from the non-fuel phase and also result in migration of the fuel phase through the graphitic structure. The main problem is that of choosing a mixing technique sufficiently gentle to avoid damage to the coatings where coated particle fuels are employed.

Our invention provides a fuel plate for this high temperature gas cooled ractor wherein the fuel particle dispersion or distribution is controlled to any desired array and contains no undesirable residues or impurities or migrated fuel phases or undesirable voids produced by carboreduction reactions.

Fuel plates using our technique are prepared from graphite filler plates such as Grafoil, and the cells are loaded as before described. The cells contain microspherical fuels and are bonded to form fuel plates for use in the high temperature gas cooled reactors. Such fuel materials as uranium carbide microspheres coated with pyrolitic carbon to a thickness of 25 microns and also uncoated 40 mil urania particles have been loaded into graphite foils for this reactor core application.

We claim:

1. A nuclear reactor fuel element comprising:
   a. at least one filler plate with a series of cells, said cells having a diameter of 10 – 3,000 microns and arranged in an ordered array;
   b. at least one microsphere of fissile material located in said cells; the ratio of said cell volume to said microsphere volume being at least 1.5;
   c. cladding plates secured to said filler plates and cooperating therewith to completely enclose said fissile material in said fuel element.

2. A nuclear reactor fuel element according to claim 1 in which said cells house one microsphere of fissile material.

3. A nuclear reactor fuel element comprising:
   a. at least one filler plate with a series of cells, said cells having a diameter of 10 – 3,000 microns and arranged in an ordered array;
   b. at least one microsphere of fertile material located in said cells; the ratio of said cell volume to said microsphere volume being at least 1.5;
   c. cladding plates secured to said filler plates and cooperating therewith to completely enclose said fertile material in said fuel element.

4. A nuclear reactor fuel element according to claim 3 in which said cells house one microsphere of fertile material.

5. A nuclear reactor fuel element comprising:
   a. at least one filler plate with a series of cells containing at least one microsphere of fissile material, said cells having a diameter of 10 – 3,000 microns and arranged in an ordered array; the ratio of said cell volume to said microsphere volume being at least 1.5;
   b. at least one filler plate with a series of cells containing at least one microsphere of fertile material, said cells having a diameter of 10 – 3,000 microns and arranged in an ordered array; the ratio of said cell volume to said microsphere volume being at least 1.5;
   c. cladding plates secured to said filler plates and cooperating therewith to completely enclose said fertile and fissile material in said fuel element.

* * * * *